United States Patent
Loveless et al.

(10) Patent No.: US 9,548,603 B2
(45) Date of Patent: Jan. 17, 2017

(54) ENVIRONMENTALLY SEALED CABLE BREAKOUT ASSEMBLIES

(71) Applicant: HUBER+SUHNER AG, Herisau (CH)

(72) Inventors: Richard Loveless, Burlington, VT (US); Randall Whitcomb, South Burlington, VT (US)

(73) Assignee: Huber+Suhner AG, Herisau (CH)

( * ) Notice: Subject to any disclaimer, the term of this patent is extended or adjusted under 35 U.S.C. 154(b) by 0 days.

(21) Appl. No.: 14/382,270

(22) PCT Filed: Mar. 12, 2013

(86) PCT No.: PCT/EP2013/055046
§ 371 (c)(1),
(2) Date: Aug. 29, 2014

(87) PCT Pub. No.: WO2013/013649
PCT Pub. Date: Sep. 26, 2013

(65) Prior Publication Data
US 2015/0155697 A1    Jun. 4, 2015

Related U.S. Application Data

(60) Provisional application No. 61/613,723, filed on Mar. 21, 2012.

(51) Int. Cl.
| | |
|---|---|
| *H02G 15/076* | (2006.01) |
| *H02G 15/113* | (2006.01) |
| *H02G 15/117* | (2006.01) |
| *G02B 6/36* | (2006.01) |
| *G02B 6/38* | (2006.01) |
| *G02B 6/44* | (2006.01) |

(52) U.S. Cl.
CPC ......... *H02G 15/076* (2013.01); *G02B 6/3616* (2013.01); *G02B 6/4471* (2013.01); *H02G 15/113* (2013.01); *H02G 15/117* (2013.01); *G02B 6/3817* (2013.01); *G02B 6/4416* (2013.01); *Y10T 29/49826* (2015.01)

(58) Field of Classification Search
CPC ............................... H01R 4/021; H01R 4/023
USPC ................................................. 174/88 R, 92
See application file for complete search history.

(56) References Cited

U.S. PATENT DOCUMENTS

| | | | | |
|---|---|---|---|---|
| 4,298,415 | A * | 11/1981 | Nolf ..................... | B29C 61/0641 156/85 |
| 4,625,073 | A * | 11/1986 | Breesch .............. | B29C 61/0608 156/49 |
| 4,691,080 | A * | 9/1987 | Reinhart .............. | H01R 13/533 174/88 R |
| 5,119,457 | A | 6/1992 | Callahan | |

(Continued)

FOREIGN PATENT DOCUMENTS

| | | |
|---|---|---|
| DE | 33 02 677 C2 | 3/1987 |
| EP | 0 137 244 A2 | 4/1985 |

(Continued)

*Primary Examiner* — Chau N Nguyen
(74) *Attorney, Agent, or Firm* — Pauley Erickson & Kottis

(57) ABSTRACT

The invention is directed to a cable breakout assembly (1) comprising a first gland for a feeder cable (10) and several second glands (13) for power feeder subassemblies (12) and an enclosure (2) comprising at least one carrier (3). The at least one carrier is suitable to be interconnected to at least one second gland.

9 Claims, 3 Drawing Sheets

(56) References Cited

U.S. PATENT DOCUMENTS

| | | | | | |
|---|---|---|---|---|---|
| 5,403,977 | A | * | 4/1995 | Steptoe | H01R 4/70 156/49 |
| 5,760,332 | A | * | 6/1998 | Rocci | H01R 4/70 174/84 R |
| 6,242,700 | B1 | * | 6/2001 | Smith | H02G 15/013 174/77 R |
| 6,963,690 | B1 | | 11/2005 | Kassal et al. | |

FOREIGN PATENT DOCUMENTS

| EP | 0 753 773 A1 | 1/1997 |
|---|---|---|
| EP | 2 354 824 A1 | 8/2011 |
| WO | WO 2012/038104 A1 | 3/2012 |
| WO | WO 2013/063045 A1 | 5/2013 |

\* cited by examiner

ENVIRONMENTALLY SEALED CABLE BREAKOUT ASSEMBLIES

BACKGROUND OF THE INVENTION

Field of the Invention

The present invention relates to a cable breakout assembly remote radio heads (RRH).

Discussion of Related Art

Radio heads and other equipment for amplifying and transmitting signals from antenna towers were traditionally positioned at the base of the tower in order to facilitate the installation and maintenance thereof. However, there has been a problem with respect to the signal losses experienced and the power consumption involved in this configuration.

So called remote radio heads (RRH) have become an important subsystem of today's new distributed base stations. The remote radio head in general contains the base station's RF circuitry plus analog-to-digital/digital-to-analog converters and up/down converters. RRHs may also have operation and management processing capabilities and a standardized optical interface to connect to the rest of the base station. Relocating the transmission and amplification components to the top of the tower served to reduce the signal losses and power requirements, however, even though the signal was run through the feeder cable extending up the tower, it was also necessary to run a DC power cable up the tower in order to boost the signal power to the individual amplifiers. Also, this type of prior art system required a separate feeder cable to be connected with the individual radio leads for each amplifier at the top of the tower.

This construction presents problems in that a larger number of cables are required to run up the tower, which involves a number of cable pulls, and also undesirably occupies space on the tower. This is especially costly when one considers that the installation costs increase with more cables, because installers typically charge per cable pull required, and the overall costs increase because tower owners may charge by the number of cables. The added weight of numerous cables can be a drawback, as well as wind loading issues related to multiple-cable configurations on the tower. In addition, the use of more components introduces the potential for increased installation steps, and more maintenance issues associated with more connections.

U.S. Pat. No. 6,963,690, assigned to the US-Navy, was first published in 2005. It is directed to a device for terminating a hybrid electrical/fiber optic cable. The connector comprises a clamp assembly affecting a swage lock on a "k-tube" (see www.k-tube.com) to prevent movement of the k-tube within the connector and resultant damage to the optical fibers. The clamp assembly comprises two clamp halves, at least one of which includes a k-tube groove, one or more optical fiber grooves, a fan out cavity, and means for joining the clamp halves. US '690 is not applicable for RRH according to the present invention.

From the same applicant hybrid cable assemblies have been successfully brought to the marked that minimize the amount of cables running up the mast. A compact divider splits a multi-fiber/wire cable into individual ruggedized outdoor cables, which are linked to the RRHs either directly or via extension jumpers. The cabling system has excellent installation features like robust pulling tubes and a filed manageable method to strip and excess power cable at the base station.

SUMMARY OF THE INVENTION

It is an object of the present invention to provide an improved cable breakout assembly. It is a further object of the present invention to provide an improved hybrid cable breakout assembly.

An improved cable breakout assembly according to the present invention provides the ability to provide a single power feeder cable and associated assembly that can provide power to a number of individual amplifiers at the top of a radio (cell) tower. In addition, the invention offers the ability to exchange data with the RRH in a single cable. The construction according to the present invention reduces the number of cables extending up the tower and cable pulls, and reduces the number of connections required. At the top of the tower, a single feeder cable interfaces with a number of radio leads for amplifiers within an environmentally sealed container or through sealed, flexible conduits.

An advantage of the cable breakout assembly according to the present invention results from the simple and efficient configuration and assembly. Furthermore, the cable breakout assembly according to the present invention offers a compact, lightweight design which is nevertheless very robust. This is achieved in that the cable breakout assembly comprises an enclosure with a special design. The enclosure comprises a carrier, which is suitable for receiving at least one cable gland for a subassembly. The carrier is preferably designed such that the at least one cable gland can easily be attached to the carrier when assembling the cable breakout assembly.

According to one embodiment of the present invention, a cable breakout structure is provided. The number of breakouts is ultimately determined by the size of the feeder cable, where a larger feeder cable can provide a greater number of breakouts, as would be understood by those skilled in the art. For example, a 6-conductor feeder cable is spliced 3 times, so each splice section includes a hot, a neutral and a drain wire. The wires of each spliced section of the feeder cable is crimped together with two conductors and a drain wire of a respective radio cable at splice crimps that are made, for example, of thin plated copper. Each splice/crimp section may be sealed with a shrink tube (e.g. a ½ inch shrink tube) that encloses the spliced/crimped portions and extends, at each end, over a portion of the cable jackets of the spliced feeder cable and the radio lead cables, respectively. In that manner, six individually sealed splice crimps are provided as an interface between one feeder cable and three separate radio leads. The overall area of the splice/crimp sections is also sealed, for example, within a shrink tube boot, which also overlaps, at its four ends, the feeder cable jacket and the cable jackets of the respective radio leads.

The cable breakout section is then enclosed and sealed within a cable breakout enclosure. The cable breakout enclosure of a preferred embodiment comprises two halves which fit together. The carrier for at least two cable glands may form part of the outer casing of the enclosure.

The improved performance and reliability of a cable breakout assembly according to the present invention is also a cost effective solution, in that, for example, using a single feeder cable reduces installation costs (fewer cable pulls, fewer hoist grips, ground straps and support blocks) and tower fees (fewer cables) and, since service is needed less often, if at all, service and maintenance costs are reduced or prevented. In addition, the cable breakout assembly according to this embodiment of the present invention also enables the feeder cable to be supplied on reels at longer lengths (e.g., 200+m), and provides a "plug and play" feature for direct deployment, with no tools required, which reduces the hardware and installation time. According to one aspect of the present invention, the cable breakout assembly includes a spool of feeder cable, a portion of a breakout enclosure affixed to an end portion thereof at a location before the feeder cable is spliced, the sealed, splice/crimped breakout section, which is housed within the enclosure and which interfaces with the radio leads crimped thereto, and the radio lead extensions protruding from the other end of the breakout enclosure, which are fitted, for example, with connectors to enable the plug-and-play benefits of the present invention.

The ends of the separated cable sections within each of the environmentally protected flexible conduits respectively mate with a device, such as an end of a high pin count Buccaneer connector, which is connected to radio lead cables at its other end. That is to say, in that construction, the Buccaneer connector serves as an interface between the separated feeder cable sections and the respective radio lead cables. Other devices or cables that can interface with the feeder cable sections within the flexible conduits include, but are not limited to Remote Radio Heads (RRH), antennas, Remote Electronic Tilt (RET) and other suitable connectors.

According to another aspect of the second embodiment of the present invention, the cable breakout assembly includes a spool of feeder cable, the splice puck breakout structure affixed to an end portion thereof at a location before the feeder cable is split, and the flexible conduits protruding from the other end of the splice puck breakout structure, which are fitted, for example, with connectors to enable the plug-and-play benefits of the present invention.

In one embodiment a cable breakout assembly according to the present invention comprises a feeder cable adapted to be spliced or separated into a plurality of sections, each section including at least a hot wire and a neutral wire. A plurality of radio leads corresponding to the plurality of feeder cable sections, joined to the respective spliced sections of the feeder cable at crimps or similar means. A breakout enclosure including a first portion having a closed end and an open end to enable access to an interior space thereof, a second portion having a closed end and an open end to enable access to an interior space thereof, a cable nut having a single port cable gland installed in and extending from the closed end of the first portion and through which the feeder cable extends, and one or more cable nuts each having at least a single-port cable gland, so that a total number of ports corresponds to the plurality of radio leads, installed in and extending from the closed end of the second portion and through which respective ends of the radio leads extend. A plurality of first environmental sealing structures enclosing each crimp between the spliced sections of the feeder cable and a respective radio lead, and a second environmental sealing structure enclosing each sealed crimp and extending over a portion of a cable jacket of the feeder cable just before the sealed crimps and portions of cable jackets of the respective radio leads just after the sealed crimps and defining a sealed, crimped cable breakout section. The open end of the first portion of the breakout enclosure is threadedly engaged with the open end of the second portion of the breakout enclosure and sealed with a sealant to enclose the sealed, crimped cable breakout section therein. Furthermore, the cable breakout assembly may comprise a feeder cable having a plurality of conductors and being adapted to be separated into a plurality of conductor sections, a breakout structure (splice puck) having a first end threadedly engaged with a cable nut having a single-port cable gland through which the feeder cable extends, a central conduit, which houses the sections of the feeder cable passing there through, and an opposed second end threadedly engaged with a cable nut having a multi-port cable gland, whose number of ports corresponds to the number of splices of the feeder cable; and a plurality of flexible conduits, each having a first end that interfaces with and extends from a respective port of the multi-port gland, and a second end adapted to interface with an external device, each flexible conduit housing a respective spliced section of the feeder cable therein.

A preferred cable breakout assembly according to the present invention in general comprises a breakout enclosure with a first end and a second end. A feeder cable is attached to the first end and at least two power feeder pigtail subassemblies are attached to the second end. Each power feeder pigtail subassembly comprises an electrical connector foreseen to be interconnected to a remote radio head. If appropriate, the power feeder pigtail subassemblies can be hard wired to a RRH. In an embodiment, the first and the second end of the breakout enclosure are arranged opposite to each other at a distance spaced apart. If appropriate, the first and the second end can be arranged at an angle with respect to each other. A first axis of the feeder cable and second axis of the at least one pigtail subassembly are preferably arranged parallel to each other. Depending on the field of application, they can be arranged at an angle with respect to each other. In one embodiment the distance between the first axis and the second axis is within a range of 0 to 20 centimeter (cm). In a preferred embodiment the cable breakout assembly has a hybrid setup with at least one optical feeder pigtail subassemblies, whereby the number of optical feeder pigtail subassemblies corresponds to the number of power feeder pigtail subassemblies. Furthermore, a feeder cable according to the present invention comprises at least one first empty conduit (ductwork) foreseen to receive at least one optical fiber. The optical fiber is preferably displaceable within and relative to the first empty conduit. If appropriate, for each optical fiber a single ductwork can be foreseen. In an embodiment, the first empty conduit ends in a secondary breakout structure in which at least one second empty conduit ends foreseen to receive at least one optical fiber. The second empty conduit is preferably arranged in general opposite to the first empty conduit with respect to the secondary breakout structure. Alternatively or in addition, the feeder cable may comprises several first empty conduits, each directly ending in an optical connector of an optical pigtail subassembly.

A cable breakout assembly according to the present invention normally comprises a hybrid cable assembly, which preferably has factory terminated fibers and an integrated shielded power cable. It becomes possible to install the cable breakout assembly by plug and play installation whereby—in difference to the prior art—no field termination/wrapping/or other preparation is necessary.

In an embodiment, a cable breakout assembly according to the invention comprises at least one first gland for a feeder cable and several second glands for at least two power feeder subassemblies. The at least one first gland and the at least two second glands are in a mounted position interconnected to an enclosure comprising at least one carrier. The carrier is preferably designed detachable from the enclosure. The second glands are designed to be attached to the carrier. If the carrier is designed detachable from the enclosure, the second glands are preferably attached to the carrier outside of the enclosure. I.e. the power feeder subassemblies are assembled separately and attached to the second glands, which then are attached to the carrier. Afterwards, the carrier is attached to at least one casing of the enclosure before the enclosure is closed. The carrier may form part of the outer structure of the enclosure of the cable breakout assembly. If required, the inside of the casing is filled-up at least partially by a casting resin.

If appropriate, the cable breakout assembly may comprise a second breakout structure for at least one optical cable. In a preferred embodiment, the second breakout structure is integrated into the carrier. The second breakout structure may be arranged in the center of the carrier. The second breakout structure may be integrated into the carrier or designed as a separate part. Easy assembly can be achieved if the second glands are arranged around the second breakout structure. The carrier may comprise holding means to hold at least one second cable gland.

The holding means (e.g. fingers) can be designed such that the second glands can be snapped on or between the fingers. The enclosure may comprise an upper casing and a lower casing which in a mounted position at least partially encompass the carrier. The upper casing and the lower casing may interact with each other in length direction or in lateral direction. A first axis of the feeder cable and second axis of the at least one pigtail subassembly may be arranged parallel to each other.

A method for assembly of a cable breakout assembly according to the invention may comprise the following method steps: Providing an enclosure; providing a carrier; attaching at least one second cable gland to the carrier; attaching the carrier to the enclosure; sealed closing the enclosure. If appropriate a power feeder subassembly is attached to the second cable gland before the cable gland is attached to the carrier. If appropriate a second breakout structure is attached to the carrier before a second cable gland is attached to the carrier. If appropriate several second cable glands are arranged around the second breakout structure.

BRIEF DESCRIPTION OF THE DRAWINGS

For a better understanding of the present invention, please refer to the detailed description below read in connection with the accompanying drawings, which should not be considered limiting to the invention described in the appended claims. The drawings are showing:

DETAILED DESCRIPTION OF THE INVENTION

Figure 1:
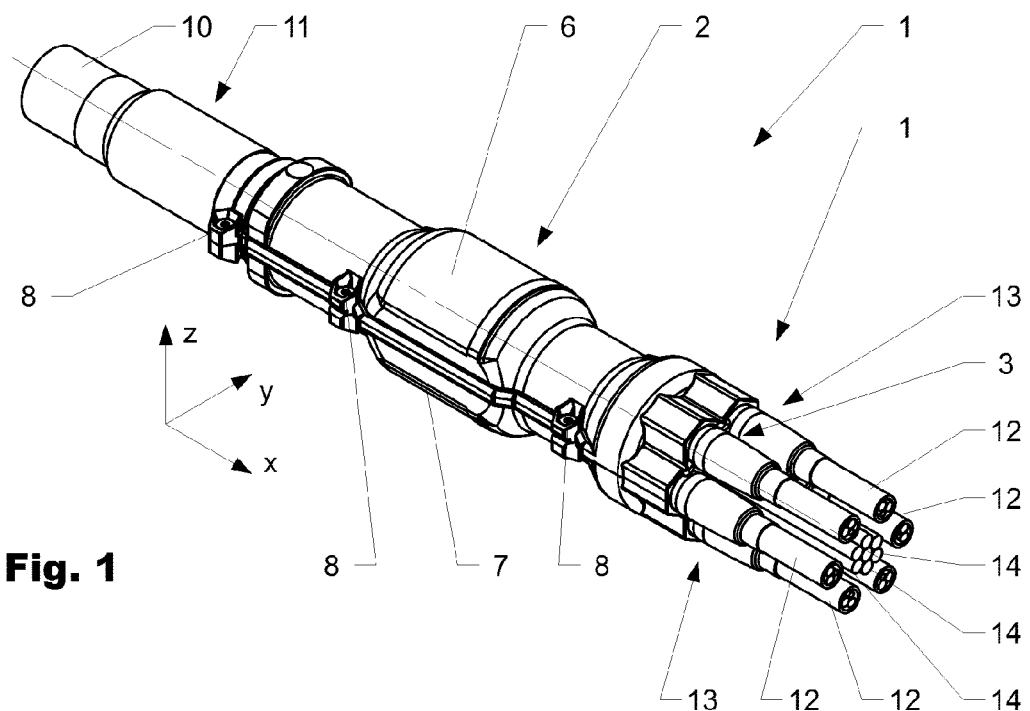
FIG. 1 a cable breakout assembly in a perspective.

When nothing else is indicated, similar parts are indicated with the same reference numerals.

Figure 2:
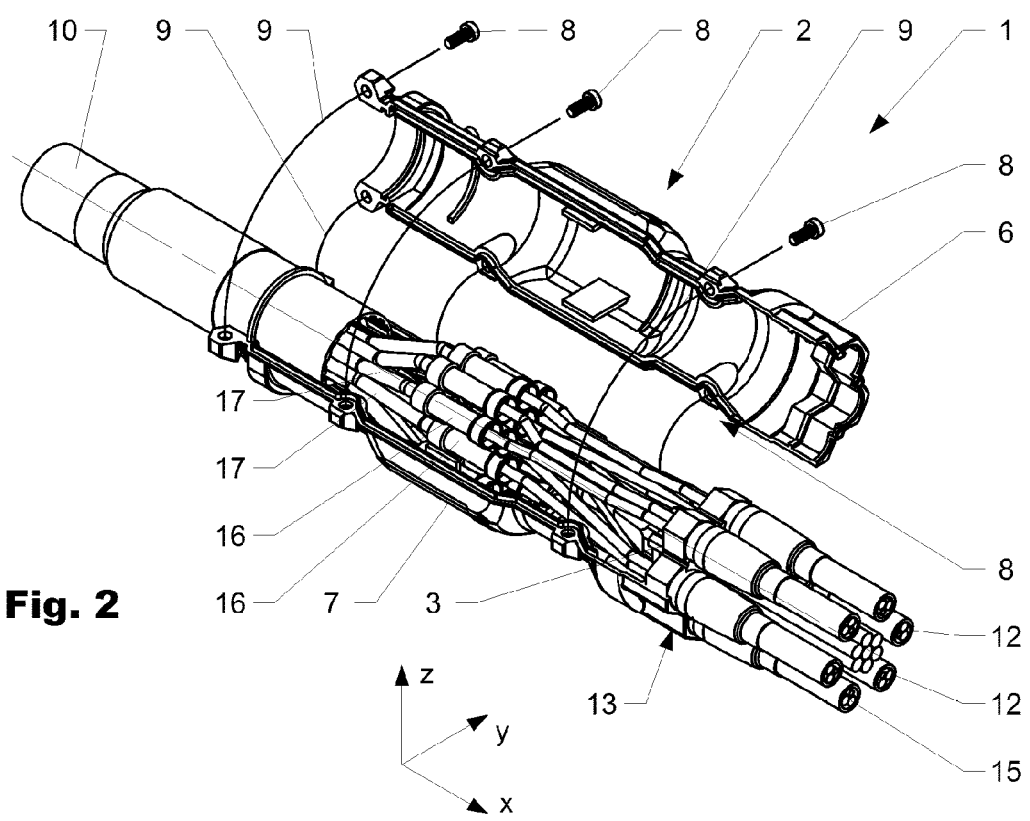
FIG. 2 the cable breakout assembly according to FIG. 1 in an open state.
Figure 3:
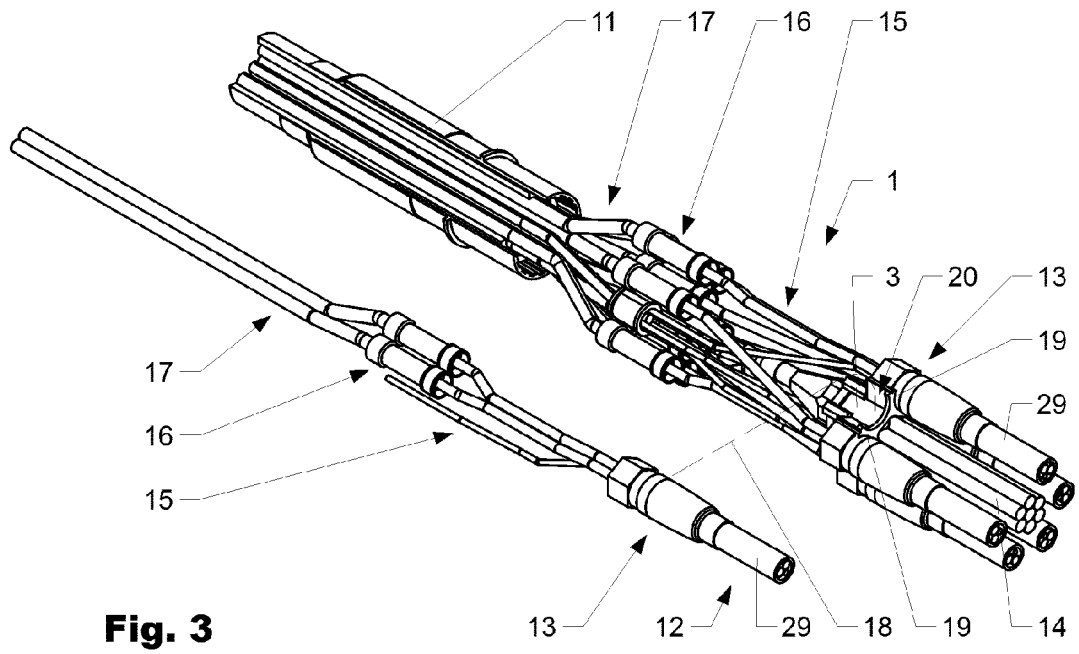
FIG. 3 the cable breakout assembly without casing.
Figure 4:
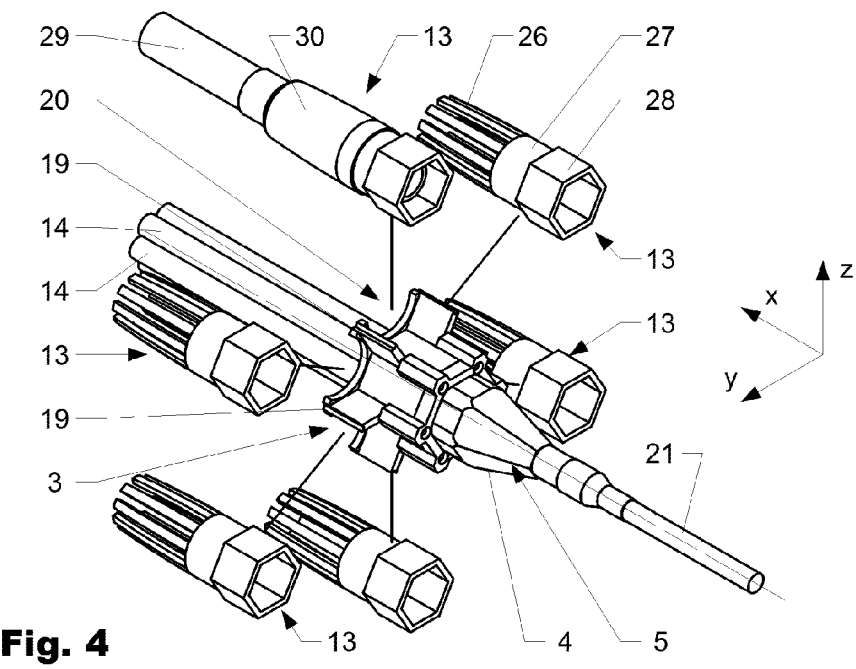
FIG. 4 a carrier for cables.
Figure 5:
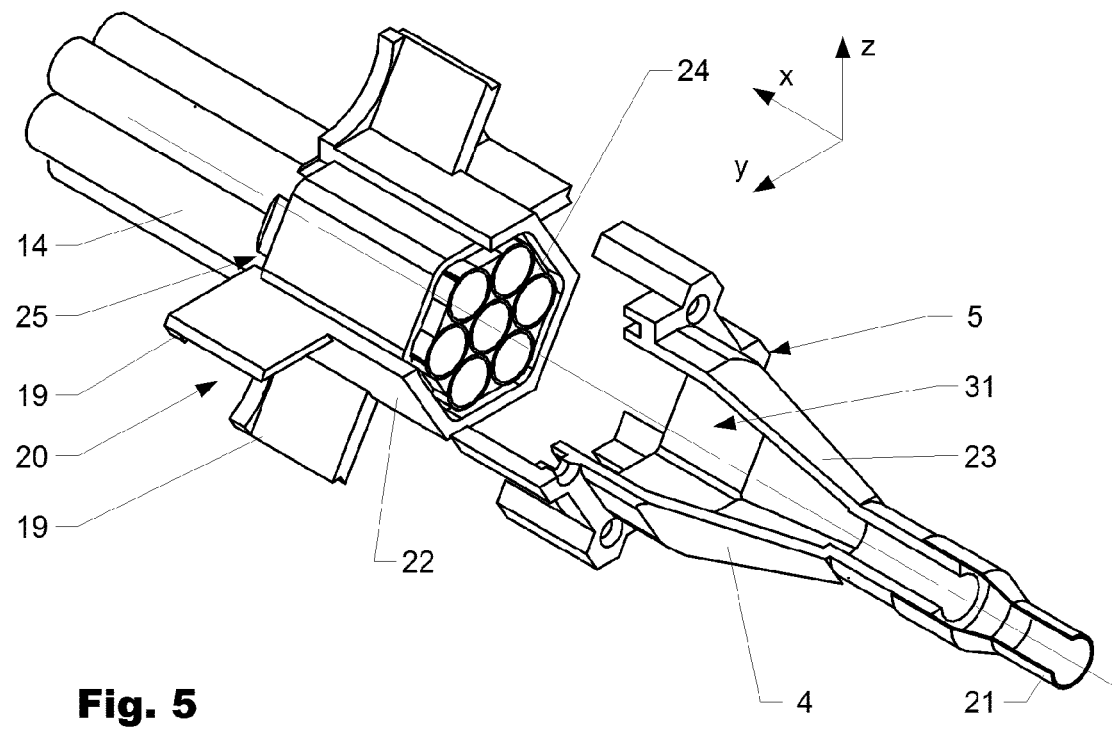
FIG. 5 the carrier according to FIG. 4 in a partially cut manner.

FIG. 1 is showing a cable breakout assembly 1 with a breakout enclosure 2 in a perspective view. FIG. 2 is showing the cable breakout assembly 1 with an open breakout enclosure 2. FIG. 3 is showing the cable breakout assembly 1 without the external casing 2 according to FIG. 2. FIG. 4 is showing a carrier 3 in a perspective manner. FIG. 5 is showing details of a housing 4 of a second breakout structure 5.

The cable breakout assembly 1 comprises a feeder cable 10, which is interconnected via a first cable gland 11 to a first end of the breakout enclosure 2. The first cable gland 11 is of special type which will be explained in more detail further down. On the opposite end of breakout enclosure 2 several power feeder subassemblies 12 are interconnected via second cable glands 13 to the breakout enclosure 2. The second cable glands 13 are arranged in a peripheral manner surrounding several second conduits 14 arranged in the middle. The second conduits 14 are suitable to receive optical fibers (not shown in detail) for transmitting data e.g. to a remote radio head. In the shown embodiment the carrier 3 is forming part of the enclosure 2, respectively its outer shape. In a closed position it tightly mates with the upper and the lower casing 6, 7. The enclosure 2 may comprise an opening (not shown in detail) to fill in casting resin to fill the interior of the enclosure 2 at least partially. The casting resin is to protect the inside of enclosure against environmental influences. If appropriate the enclosure 2 and or the carrier 3 can be equipped or designed interconnectable to an adapter which allows to pull the cable breakout assembly 1 up along a mast (not shown in detail). The adapter can e.g. have the form of a hook or an eye to which a rope can be connected.

In FIG. 2 the enclosure 2 is shown in an open state such that the inside of the cable breakout assembly 1 can be partially seen. The enclosure 2 comprises an upper casing 6 and a lower casing 7, which are attached to each other by bolts 8. The assembly is schematically indicated by lines 9. Each of the power feeder subassemblies 12 comprises at least one wire 15 for the supply of electrical energy to an interconnected device, e.g. a remote radio head, etc. In a usual configuration a power feeder subassembly 12 comprises at least one hot wire and at least one neutral wire. If appropriate, the power feeder subassembly 12 can further comprise means for exchanging of information, such as a coaxial cable or an optical cable, etc. (not shown in detail). In the shown embodiment the several (different) wires 15 of the power feeder subassembly 12 are interconnected, e.g. by a first connector 16 to related wires 17 of the feeder cable 10.

FIG. 3 shows the cable breakout assembly 1 without the enclosure 2. The wires 15 of a power feeder subassembly 12 and the thereto related wires 17 of the feeder cable 10 are shown in an isolated manner. Furthermore, the first cable gland 11 is shown in a partially cut manner. The second cable glands 13 of the isolated power feeder subassemblies 12 are designed such that they can be mechanically interconnected to the carrier 3 arranged in the middle of the second cable glands 13. The path of assembly is schematically indicated by a second assembly path 18.

The carrier 3 and the second cable glands 13 are shown in an isolated manner in FIG. 4 in an opposite direction. As it can be seen, the carrier 3 of the shown embodiment comprises fingers 19 arranged in a radial direction and designed to receive and hold the second cable glands 13. The second cable glands can be inserted in a radiall direction in a here semi-circled recess 20 formed by two adjacent fingers 19. The second cable glands 13 are preferably shaped such that they precisely fit in the recess 20. Especially, if the enclosure 2 is filled with a casting resin (not shown in detail) this prevents unwanted leakage.

The cable gland 13 as shown in FIG. 4 comprises several flexible fins 26, which protrude from a bottom ring 27 with a hexagonal base 28. The bottom ring 27 is designed that is can be arranged in the recess 20 between the fingers 19. Thereby, the hexagonal base 28 is designed that in a mounted position on the carrier 3, the outer shape of the hexagonal bases 28 mate with each other and/or the carrier 3, e.g. surrounding the carrier 3, which is arranged in the center. The carrier 3 comprises a corresponding outer shape. Depending on the field of application, the gland 13 and the carrier 3 may have another design. The fins 26 are designed such that they can easily adapt to different diameters of a cable 29 of a power feeder subassembly 12. To attach the gland 13 to a cable 29, the cable 29 is arranged inside the fins 26. Afterwards, a heat shrink tube 30 is arranged on the fins and appropriate glue (not shown in detail) is arranged between the fins and the cable 29 forming a reliable connection. The flexible fins 26 offer very good distribution of the occurring forces. A cable gland with fins 26 can be used for other applications.

As it can be best seen in the partially cut view according to FIG. 5, the carrier 3 of the shown embodiment acts as, respectively comprises the housing 4 of the secondary breakout structure 5 for optical cables (not shown in detail). The housing 4 is interconnected to a first conduit 21 and several second conduits 14, which all end in a compartment 31 (see FIG. 5) inside the housing 4. In FIG. 5 the housing 4 is shown in a disassembled manner. The housing 4 comprises a front part 22 and a rear part 23 which can be assembled in x-direction. In the shown embodiment the second conduits 14 are attached to the front part 22 of the housing 4 by epoxy resin 24. The front part 22 of the housing 4 comprise at least one opening 25, into which the second conduits 14 can be inserted where they then are fixed by the epoxy resin 24. The first conduit 21 is foreseen to receive several optical fibers, which are separated from each other in the compartment 22 and let into the second conduits 14. The second conduits can receive one or more optical fibers (not shown in detail).

The invention claimed is:

1. A cable breakout assembly including a first breakout structure comprising:
   a. a first gland for a feeder cable;
   b. a plurality of second glands for power feeder subassemblies;
   c. an enclosure with a first end and a second end, the second end arranged opposite the first end, the enclosure comprising at least one carrier, wherein the first gland is arranged at the first end of the enclosure and the plurality of second glands are arranged at the second end of the enclosure;
   d. wherein said at least one carrier is interconnected to at least one second gland of the plurality of second glands; and
   e. a second breakout structure for at least one optical cable, wherein the plurality of second glands are arranged around the second breakout structure, and wherein the second breakout structure is integrated into the carrier.

2. The cable breakout assembly according to claim 1, wherein the second breakout structure is arranged in a center of the carrier.

3. The cable breakout assembly according to claim 1, wherein the carrier comprises holding means to hold at least one second gland of the plurality of second glands.

4. The cable breakout assembly according to claim 1, wherein the enclosure comprises an upper casing and a lower casing, which, in a mounted position, at least partially encompass the carrier.

5. The cable breakout assembly according to claim 4, wherein the upper casing and the lower casing interact in length direction or in lateral direction.

6. The cable breakout assembly according to claim 1, wherein a first axis of the feeder cable and a second axis of at least one pigtail subassembly are arranged parallel to each other.

7. The cable breakout assembly according to claim 1, wherein the enclosure is at least partially filled with a casting resin.

8. A method of assembly of a cable breakout assembly including a first breakout structure comprising the following method steps:
   a. providing a first gland for a feeder cable;
   b. providing an enclosure with the first gland arranged at a first end and an opposite second end and a plurality of second glands arranged at the second end;
   c. providing a carrier;
   d. integrating a second breakout structure into the carrier;
   e. attaching the plurality of second glands to the end of the carrier around the second breakout structure after attaching the second breakout structure into the carrier;
   f. attaching the carrier to the enclosure; and
   g. sealing the enclosure closed.

9. The method according to claim 8, wherein a power feeder subassembly is attached to the second gland before the second gland is attached to the carrier.

* * * * *